United States Patent
Hiramatsu

(10) Patent No.: US 12,090,934 B2
(45) Date of Patent: Sep. 17, 2024

(54) CONNECTING METHOD AND ELECTRICAL COMPONENT UNIT

(71) Applicant: Yazaki Corporation, Tokyo (JP)

(72) Inventor: Ryo Hiramatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 472 days.

(21) Appl. No.: 17/510,941

(22) Filed: Oct. 26, 2021

(65) Prior Publication Data
US 2022/0126767 A1    Apr. 28, 2022

(30) Foreign Application Priority Data

Oct. 28, 2020  (JP) ................................ 2020-180587

(51) Int. Cl.
*B60R 16/02*    (2006.01)
*B60R 16/023*   (2006.01)

(52) U.S. Cl.
CPC ...... *B60R 16/0215* (2013.01); *B60R 16/0238* (2013.01)

(58) Field of Classification Search
None
See application file for complete search history.

(56) References Cited

U.S. PATENT DOCUMENTS

| 7,899,954 | B2* | 3/2011 | Kanazawa ........ H04L 12/40032 |
| | | | 710/33 |
| 8,461,726 | B2* | 6/2013 | Maki ..................... H02G 3/086 |
| | | | 307/147 |
| 10,351,057 | B2* | 7/2019 | Ohashi ..................... B60Q 3/10 |
| 2018/0215306 | A1 | 8/2018 | Sugimoto |
| 2018/0334117 | A1* | 11/2018 | Matsunaga ......... B60R 16/0207 |
| 2019/0202383 | A1* | 7/2019 | Odate ..................... B60R 16/03 |
| 2020/0185871 | A1* | 6/2020 | Matsuura ............... H01R 43/00 |

FOREIGN PATENT DOCUMENTS

| JP | 2007-226696 A | 9/2007 |
| JP | 2017-35952 A | 2/2017 |
| JP | 2017-65375 A | 4/2017 |
| JP | 2019-6394 A | 1/2019 |

* cited by examiner

*Primary Examiner* — Tho D Ta
(74) *Attorney, Agent, or Firm* — Sughrue Mion, PLLC

(57) ABSTRACT

There are provided a connecting method and an electrical component unit for connecting between a plurality of electrical devices and a determination unit configured to determine a state for each of the plurality of electrical devices. The connecting method includes: providing wire harnesses having a plurality of types for each of which the number of input terminals is different, the wire harnesses being provided with a connector in which an input circuit is built, the input circuit having the input terminals respectively connected to the plurality of electrical devices and outputting a serial signal; selecting one wire harness of the wire harnesses, the one wire harness including the number of the input terminals corresponding to the number of the plurality of electrical devices; and connecting between the plurality of electrical devices and the determination unit via the one wire harness.

5 Claims, 4 Drawing Sheets

CONNECTING METHOD AND ELECTRICAL COMPONENT UNIT

CROSS-REFERENCE TO RELATED APPLICATIONS

This application is based on and claims priority under 35 USC 119 from Japanese Patent Application No. 2020-180587 filed on Oct. 28, 2020, the contents of which are incorporated herein by reference.

TECHNICAL FIELD

The present disclosure relates to a connecting method and an electrical component unit.

BACKGROUND ART

In the related art, a plurality of switches (electrical devices) and an electronic unit (a determination unit) such as an ECU that determines an on-off state of the switches are connected to each other via a wire harness. An input circuit of the switches is built in the electronic unit. Input expansion components constituting the input circuit include a plurality of types of lineup components such as 10ch, 22ch, and 33ch. However, when a design is made so as to cope with a difference in the number of channels for a grade of a vehicle or a change such as a minor change, the design is made in a 33ch input circuit through which the maximum number of inputs can be made, and manufacturing costs are increased.

JP2007-226696A and JP2019-006394A are known as techniques related to expansion of a function of an electrical device and the like.

SUMMARY OF INVENTION

The present disclosure provides a connecting method and an electrical component unit that can reduce manufacturing costs.

According to an illustrative aspect of the present disclosure, a connecting method for connecting between a plurality of electrical devices and a determination unit configured to determine a state for each of the plurality of electrical devices includes: providing wire harnesses having a plurality of types for each of which the number of input terminals is different, the wire harnesses being provided with a connector in which an input circuit is built, the input circuit having the input terminals respectively connected to the plurality of electrical devices and outputting a serial signal; selecting one wire harness of the wire harnesses, the one wire harness including the number of the input terminals corresponding to the number of the plurality of electrical devices; and connecting between the plurality of electrical devices and the determination unit via the one wire harness.

According to another illustrative aspect of the present disclosure, an electrical component unit includes: a determination unit configured to determine a state for each of a plurality of electrical devices; and a wire harness that connects between the plurality of electrical devices and the determination unit. The wire harness includes a connector attached to a terminal of the wire harness. The connector includes an input circuit configured to convert a state signal for each of the plurality of electrical devices into a serial signal, and then output the serial signal, the input circuit being built in the connector. And, the input circuit has a plurality of input terminals respectively connected to the plurality of electrical devices.

The present disclosure has been briefly described above. Further, details of the present disclosure will be clarified by reading an aspect (hereinafter, referred to as an "embodiment") for implementing the disclosure to be described below with reference to the accompanying drawings.

DESCRIPTION OF EMBODIMENTS

A specific embodiment according to the present disclosure will be described below with reference to the drawings.

Figure 1:
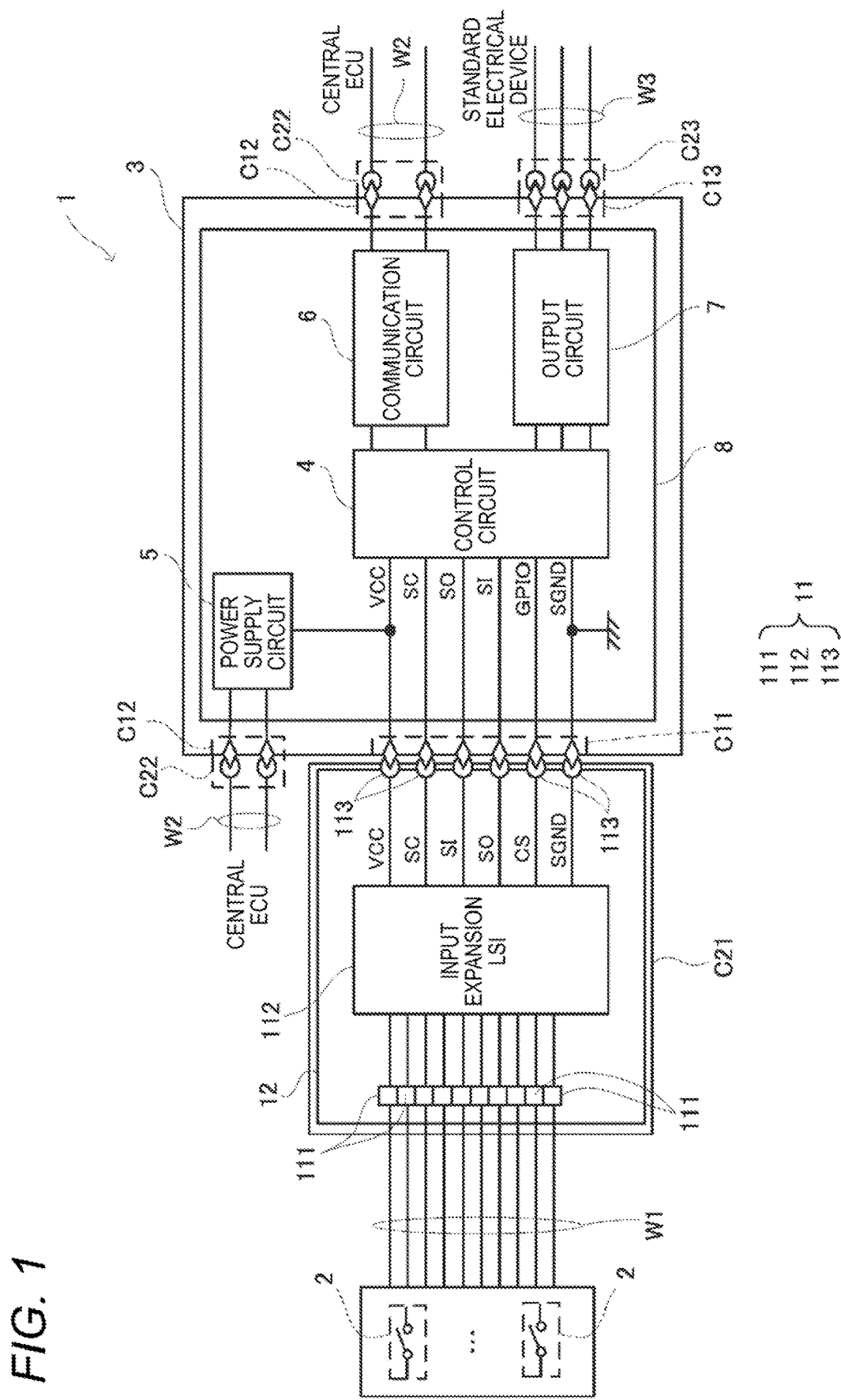
FIG. 1 is a circuit diagram showing an electrical component unit according to an embodiment of the present disclosure.

FIG. 1 is a circuit diagram showing an electrical component unit according to an embodiment of the present disclosure. An electrical component unit 1 according to the present embodiment is mounted in a vehicle. The electrical component unit 1 includes an electronic unit 3 that determines on-off states of a plurality of switches 2 (electrical devices), and a wire harness W1 that connects the plurality of switches 2 to the electronic unit 3.

The electronic unit 3 includes a plurality of connectors C11 to C13, a control circuit 4 (a determination unit), a power supply circuit 5, a communication circuit 6, an output circuit 7, and a substrate 8 on which the connectors C11 to C13, the control circuit 4, the power supply circuit 5, the communication circuit 6, and the output circuit 7 are mounted.

The connector C11 is connected to a connector C21 provided at a terminal of the wire harness W1. The wire harness W1 is connected to each of the plurality of switches 2. The connector C12 is connected to a connector C22 provided at a terminal of a wire harness W2. The wire harness W2 is connected to a central ECU (a host device, an external device). The connector C13 is connected to a connector C23 provided at a terminal of a wire harness W3. The wire harness W3 is connected to a standard electrical device. Specific configurations of the central ECU and the standard electrical device are not shown in any figures.

The control circuit 4 is configured from, for example, a microcomputer having a CPU. The control circuit 4 communicates with the central ECU, and determines on-off states of the switches 2 or controls the standard electrical device in accordance with an instruction from the central ECU. The power supply circuit 5 generates power for the control circuit 4 from power supplied via the connector C12. The communication circuit 6 is a circuit that modulates and demodulates communication signals transmitted and received between the central ECU and the control circuit 4. The output circuit 7 is a circuit that outputs an output signal to a standard electrical device such as a motor or a lamp.

Figure 2:
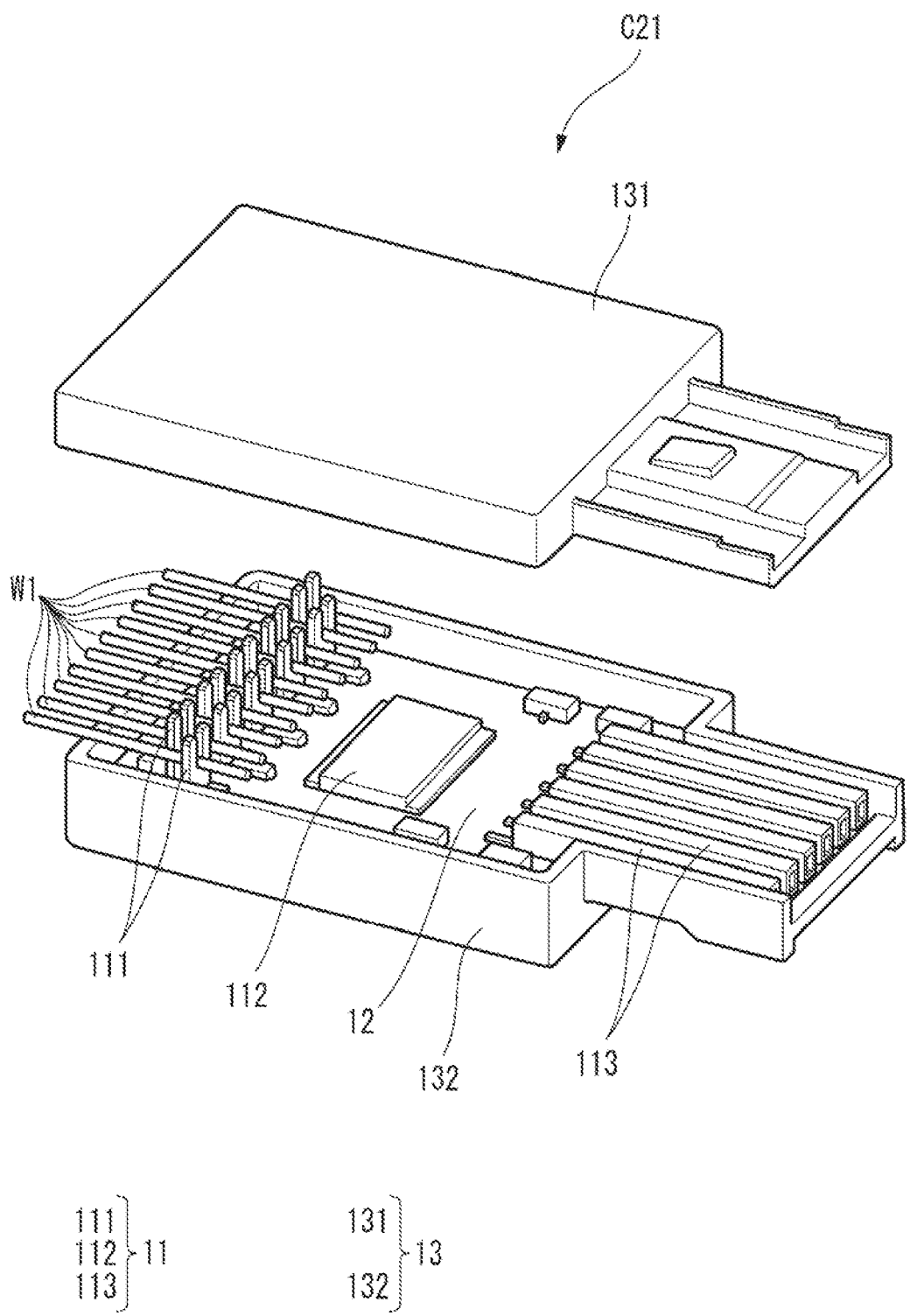
FIG. 2 is an exploded perspective view of a connector shown in FIG. 1.

The connector C21 is attached to a terminal at the electronic unit 3 side of the wire harness W1 connected to the switches 2. As shown in FIGS. 1 and 2, the connector C21 includes an input circuit 11, a substrate 12 on which the input circuit 11 is mounted, and a housing 13 that houses the substrate 12. The input circuit 11 includes terminals 111 (input terminals) connected to the wire harness W1, an input expansion LSI 112, and a terminal 113 connected to the electronic unit 3. As shown in FIG. 2, the terminals 111, the input expansion LSI 112, and the terminal 113 are arranged on a straight line on the substrate 12.

The substrate 12 is formed into a rectangular shape. The terminal 111 is provided with press contact blades erected from the substrate 12, and a terminal of the wire harness W1 is clamped to the press contact blades. In the present embodiment, the terminals 111 are provided in ten channels, and the switches 2 are connected to the terminals 111 having the ten channels via the wire harness W1. The input expansion LSI 112 will be described later. One end of the terminal 113 is connected to the substrate 12, and the other end of the terminal 113 protrudes from the substrate 12 toward the terminal 113 in an alignment direction. The housing 13 includes an upper case 131 and a lower case 132 that are divided in a thickness direction of the substrate 12.

Next, the control circuit 4 and the input expansion LSI 112 will be described in detail. As shown in FIG. 1, the control circuit 4 includes a power supply terminal VCC to which power generated by the power supply circuit 5 is supplied, and a ground terminal GND connected to the ground. The input expansion LSI 112 includes a serial clock terminal SC, a serial input terminal SI, a serial output terminal SO, and a general-purpose input and output terminal GPIO.

The input expansion LSI 112 includes a power supply terminal VCC, a ground terminal GND, a serial clock terminal SC, a serial input terminal SI, a serial output terminal SO, and a chip selector terminal CS. The power supply terminal VCC, the ground terminal GND, the serial clock terminal SC, the serial input terminal SI, the serial output terminal SO, and the chip selector terminal CS of the input expansion LSI 112 are respectively connected to the ground terminal GND, the serial clock terminal SC, the serial output terminal SO, the serial input terminal SI, and the general-purpose input and output terminal GPIO of the control circuit 4.

The serial clock terminal SC of the control circuit 4 is a terminal for outputting a clock signal from the control circuit 4 to the serial clock terminal SC of the input expansion LSI 112. The serial input terminal SI of the control circuit 4 is a terminal for inputting a serial signal output from the serial output terminal SO of the input expansion LSI 112. The serial output terminal SO of the control circuit 4 is a terminal for outputting a serial signal output from the control circuit 4 to the serial input terminal SI of the input expansion LSI 112. The general-purpose input and output terminal GPIO is connected to the chip selector terminal CS of the input expansion LSI 112.

The chip selector terminal CS of the input expansion LSI 112 functions at active Lo in the present embodiment. When the control circuit 4 outputs Lo to the chip selector terminal CS of the input expansion LSI 112, the input expansion LSI 112 converts an on-off signal (a state signal) corresponding to on-off of each of the plurality of switches 2 into a serial signal, and outputs the serial signal to the serial input terminal SI of the control circuit 4 in synchronization with a clock signal. When the control circuit 4 receives the serial signal of a corresponding bit, the control circuit 4 ends the transmission of the clock signal, and returns an output of the chip selector terminal CS of the input expansion LSI to Hi.

The control circuit 4 transmits the on-off signal of the switches 2 received from the input expansion LSI 112 to the central ECU. The control circuit 4 controls the output circuit 7 and the standard electrical device on the basis of the communication between the control circuit 4 and the central ECU.

Figure 3:
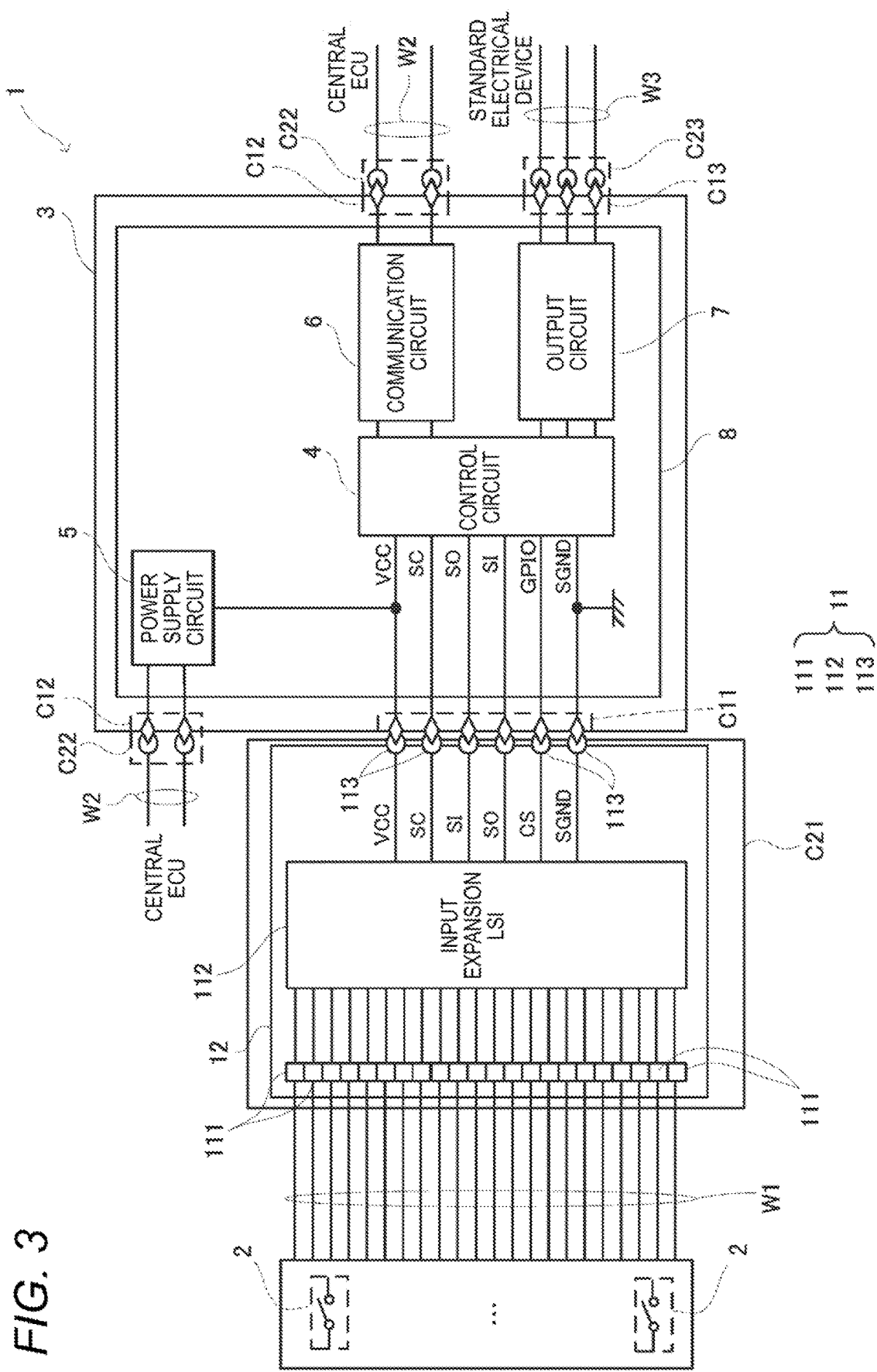
FIG. 3 is a circuit diagram showing an electrical component unit according to another embodiment of the present disclosure.

Next, a connecting method according to the present disclosure for connecting the switches 2 and the electronic unit 3 will be described. The input circuit 11 having the terminals 111 provided in the ten channels is built in the connector C21 attached to the terminal of the wire harness W1 shown in FIG. 1. In the connecting method according to the present embodiment, a plurality of types of wire harnesses W1 in which the number of channels of the terminals 111 is different are prepared. For example, three types of wire harnesses W1 are prepared, in which input circuits 11 having terminals 111 of 10 channels (shown in FIG. 1), 22 channels (shown in FIG. 3), and 33 channels (not shown) are respectively built. The three types of wire harnesses W1 are different only in the number of terminals 111, and are common in the number and function of the terminals 113 connected to the electronic unit 3.

The number of switches 2 varies depending on a grade of a vehicle. The number of switches 2 may be changed due to a minor change of the vehicle or the like. Among the three types of wire harnesses W1 described above, the wire harness W1 is selected in which the input circuit 11 having the terminals 111 provided in the number of channels corresponding to the number of switches is built, and the wire harness W1 connects the plurality of switches 2 to the electronic unit 3.

According to the connecting method described above, even when the number of the switches 2 is different depending on the grade of the vehicle, it is possible to select the wire harness W1 in accordance with the number of switches 2 and connect the switches 2 to the electronic unit 3. Even when the number of switches 2 is changed due to a minor change of the vehicle or the like, it is possible to cope with the change only by changing the wire harness W1. Accordingly, the control circuit 4 can be shared regardless of the number of switches 2, it is not necessary to discard the terminals 111, and manufacturing costs can be reduced.

Next, a method of identifying the number of terminals 111 of the input circuit 11 built in the wire harness W1 connected to the electronic unit 3 will be described. First, initial setting of the control circuit 4 by the central ECU will be described before describing the identifying method. During initial setting, the central ECU communicates with the control circuit 4 to set the serial input terminal SI, the serial output terminal SO, and the general-purpose input and output terminal GPIO (terminal).

Software is set in the control circuit 4 so that an input specification of the serial input terminal SI can be selected in accordance with a specification of the input circuit 11 (active Hi, active Lo, Hi level and Lo level threshold, switch energization current).

The central ECU sets software related to the serial input terminal SI and the serial output terminal SO of the control circuit 4 in accordance with the specification of the input circuit. Specifically, in a case where the input circuit 11 is connected to the general-purpose input and output terminal GPIO, the central ECU instructs the control circuit 4 to set the input specification of the serial input terminal SI when the general-purpose input and output terminal GPIO is set to the active Lo, to the corresponding one to the specification of the input circuit 11.

During setting the software of the serial input terminal SI and the serial output terminal SO, the central ECU transmits the number of terminals of the input circuit 11 to the control circuit 4, so that the control circuit 4 can identify the number of the input circuits 11.

According to the method of identifying the number of terminals described above, the control circuit 4 can identify the number of channels of the input circuit 11 during setting the software of the serial input terminal SI and the serial output terminal SO by the communication between the central ECU and the control circuit 4.

The present disclosure is not limited to the embodiment described above, and modifications, improvements, and the like can be made as appropriate. In addition, materials, shapes, sizes, numbers, arrangement places, and the like of elements in the embodiment described above are optional and not limited as long as the object of the present disclosure can be achieved.

According to the embodiment described above, the control circuit 4 sets the specifications of the terminals SI, SO, and GPIO and identifies the number of channels of the terminals 111 of the input circuit 11 by the communication between the central ECU and the control circuit 4. On the other hand, a setting terminal (an external device) different from the central ECU may be connected to the electronic unit 3, and the control circuit 4 may set the specifications of the terminals SI, SO, and GPIO and identify the number of channels of the terminals 111 of the input circuit 11 by communication between the setting terminal and the control circuit 4.

The specification setting of the terminals SI, SO, and GPIO and the number of channels of the terminals 111 of the input circuit it may be written in a memory of the control circuit 4 at the time of manufacturing. The control circuit 4 is operated according to the specification written in the memory, reads the number of channels of the terminals 111, and identifies the number of channels.

Figure 4:
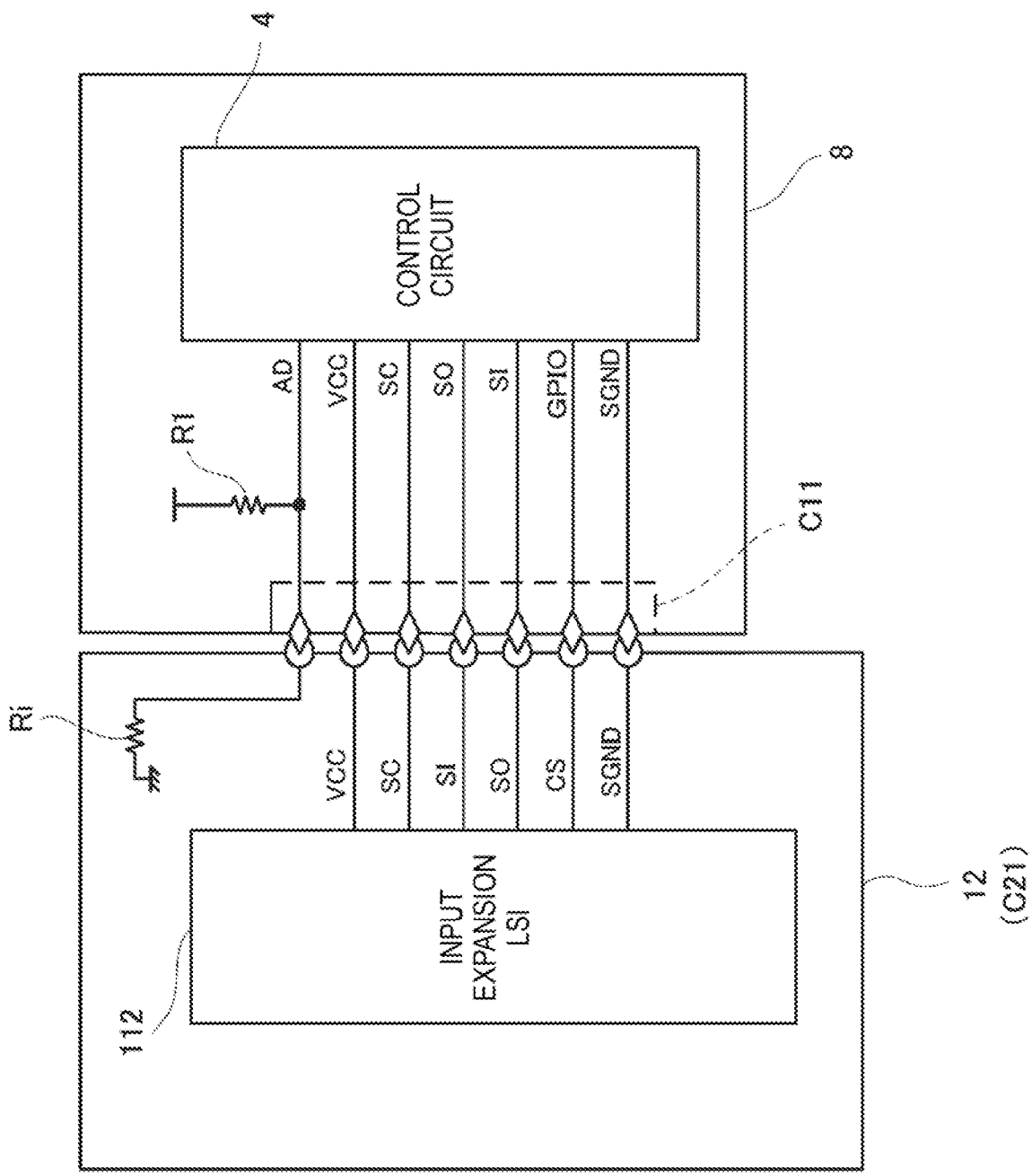
FIG. 4 is a schematic circuit diagram showing an electrical component unit according to another embodiment of the present disclosure.

According to the embodiment described above, the control circuit 4 identifies the number of channels of the input circuit 11 by the communication between the central ECU and the control circuit 4. As shown in FIG. 4, an identification resistor Ri may be provided on the substrate 12, and the control circuit 4 may read a resistance value of the resistor Ri to identify the number of channels of the input circuit 11.

The resistor Ri is changed to have a different resistance value for each number of channels. A fixed resistor R1 is provided on the substrate 8 at the electronic unit 3 side. One end of the fixed resistor R1 is connected to a power supply, and the other end of the fixed resistor R1 is connected to an AD input of the control circuit 4. When the connector C21 of the wire harness W1 is connected to the connector C11 of the electronic unit 3, the identification resistor Ri and the fixed resistor R are connected in series, and a voltage between the identification resistor Ri and the fixed resistor R1 is supplied to the AD input. The control circuit 4 can read a resistance value of the identification resistor Ri by reading the voltage value input into the AD input. Accordingly, the control circuit 4 can read the resistance value of the resistor Ri and identify the number of channels of the input circuit 11.

According to the method of identifying the number of terminals described above, the control circuit 4 can identify the number of channels without communicating with the central ECU.

According to the embodiment described above, the switch 2 is used as an electrical device, and the present disclosure is not limited thereto. An electrical device other than the switch 2 may be used.

According to a first illustrative aspect of the present disclosure, there are provided a connecting method for connecting between a plurality of electrical devices (2) and a determination unit (4) configured to determine a state for each of the plurality of electrical devices (2). The connecting method includes: providing wire harnesses (W1) having a plurality of types for each of which the number of input terminals (111) is different, the wire harnesses (W1) being provided with a connector (C21) in which an input circuit (11) is built, the input circuit (11) having the input terminals (111) respectively connected to the plurality of electrical devices (2), and converting a state signal for each of the plurality of electrical devices (2) into a serial signal, and then outputting the serial signal; selecting one wire harness of the wire harnesses (W1), the one wire harness including the number of the input terminals (111) corresponding to the number of the plurality of electrical devices (2); and connecting between the plurality of electrical devices (2) and the determination unit (4) via the one wire harness.

According to a second illustrative aspect of the present disclosure, an electrical component unit (1) includes: a determination unit (4) configured to determine a state for each of a plurality of electrical devices (2); and a wire harness (W1) that connects between the plurality of electrical devices (2) and the determination unit (4). The wire harness (W1) includes a connector (C21) attached to a terminal of the wire harness (W1), the connector (C21) includes an input circuit (11) configured to convert a state signal for each of the plurality of electrical devices (2) into a serial signal, and then output the serial signal, the input circuit (11) being built in the connector (C21), and the input circuit (11) has a plurality of input terminals (11) respectively connected to the plurality of electrical devices (2).

According to the above first and second aspects of the present disclosure, even when the number of electrical devices is different depending on the grade of the vehicle, a wire harness can be selected in accordance with the number of electrical devices, and the wire harness can connect the electrical devices to the determination unit. Even when the number of the electrical devices is changed due to a minor change of the vehicle or the like, it is possible to cope with the change only by changing the wire harness. Accordingly, the determination unit can be shared regardless of the number of the electrical devices, it is not necessary to discard the input terminals, and manufacturing costs can be reduced.

According to a third illustrative aspect of the present disclosure, the determination unit (4) includes terminals (SI, SO, GPIO) connectable to the connector (C21); the determination unit (4) is configured to execute an operation in accordance with specifications of the terminals (SI, SO, GPIO); a communication between the determination unit (4) and an external device is performed such that the specifications of the terminals (SI, SO, GPIO) are set; and the determination unit (4) is configured to identify the number of the input terminals (111) of the input circuit (11) by the communication between the determination unit (4) and the external device at a time when the specifications of the terminals (SI, SO, GPIO) are set.

According to the above third aspect of the present disclosure, the determination unit can easily identify the number of the input terminals by the communication between the external device and the determination unit during specification setting of the terminals.

According to a fourth illustrative aspect of the present disclosure, the determination unit (4) includes terminals (SI, SO, GPIO) connectable to the connector (C21), and a memory that stores specifications of the terminals (SI, SO, GPIO) and the number of the input terminals (111) of the input circuit (11), the determination unit (4) is configured to execute an operation in accordance with the specifications of the terminals (SI, SO, GPIO) stored in the memory, and the determination unit (4) is configured to read the number of the input terminals (111) stored in the memory to identify the number of the input terminals (111).

According to the above fourth aspect of the present disclosure, the determination unit can identify the specifications of the terminals and the number of the input terminals by writing the specifications of the terminals and the number of the input terminals in the memory at the time of manufacturing.

According to a fifth illustrative aspect of the present disclosure, the connector (C21) includes a resistor (Ri) built therein. The determination unit (4) is configured to read a resistance value of the resistor (Ri) to identify the number of the input terminals (111).

According to the above fifth aspect of the present disclosure, the determination unit can identify the number of the input terminals without executing communication.

According to the present disclosure, it is possible to provide a connecting method and an electrical component unit that can reduce manufacturing costs.

What is claimed is:

1. A connecting method for connecting between a plurality of electrical devices and a determination unit configured to determine a state for each of the plurality of electrical devices, the connecting method comprising:
   providing wire harnesses having a plurality of types for each of which the number of input terminals is different, the wire harnesses being provided with a connector in which an input circuit is built, the input circuit having the input terminals respectively connected to the plurality of electrical devices, and converting a state signal for each of the plurality of electrical devices into a serial signal, and then outputting the serial signal;
   selecting one wire harness of the wire harnesses, the one wire harness including the number of the input terminals corresponding to the number of the plurality of electrical devices; and
   connecting between all of the plurality of electrical devices and the determination unit via the one wire harness.

2. An electrical component unit comprising:
   a determination unit configured to determine a state for each of a plurality of electrical devices; and
   a wire harness that connects between the plurality of electrical devices and the determination unit, wherein
   the wire harness includes a connector attached to a terminal of the wire harness,
   the connector includes an input circuit configured to convert a state signal for each of the plurality of electrical devices into a serial signal, and then output the serial signal, the input circuit being built in the connector, and
   the input circuit has a plurality of input terminals respectively connected to the plurality of electrical devices.

3. The electrical component unit according to claim 2, wherein
   the determination unit includes terminals connectable to the connector;
   the determination unit is configured to execute an operation in accordance with specifications of the terminals;
   a communication between the determination unit and an external device is performed such that the specifications of the terminals are set; and
   the determination unit is configured to identify the number of the input terminals of the input circuit by the communication between the determination unit and the external device at a time when the specifications of the terminals are set.

4. The electrical component unit according to claim 2, wherein
   the determination unit includes terminals connectable to the connector, and a memory that stores specifications of the terminals and the number of the input terminals of the input circuit,
   the determination unit is configured to execute an operation in accordance with the specifications of the terminals stored in the memory, and
   the determination unit is configured to read the number of the input terminals stored in the memory to identify the number of the input terminals.

5. The electrical component unit according to claim 2, wherein
   the connector includes a resistor built therein, and
   the determination unit is configured to read a resistance value of the resistor to identify the number of the input terminals.

* * * * *